United States Patent [19]

Okada et al.

[11] Patent Number: 4,482,987
[45] Date of Patent: Nov. 13, 1984

[54] OPTICAL INFORMATION REPRODUCING APPARATUS

[75] Inventors: Kazuo Okada; Fumiaki Imado, both of Hyogo, Japan

[73] Assignee: Mitsubishi Denki Kabushiki Kaisha, Tokyo, Japan

[21] Appl. No.: 358,601

[22] Filed: Mar. 15, 1982

[30] Foreign Application Priority Data

Jul. 7, 1981 [JP] Japan .................. 56-106640

[51] Int. Cl.³ ................. H04N 5/76; G11B 21/00
[52] U.S. Cl. ......................... 369/44; 369/47; 250/202
[58] Field of Search ............. 358/342; 369/43, 44, 369/45, 47; 250/201, 202

[56] References Cited

U.S. PATENT DOCUMENTS 4,359,635 11/1982 Gross ................. 358/342 X

FOREIGN PATENT DOCUMENTS 113008 9/1979 Japan.

Primary Examiner—Robert L. Richardson
Attorney, Agent, or Firm—Lowe, King, Price & Becker

[57] ABSTRACT

An optical information reproducing apparatus comprises an optical system adapted for shifting a light spot to impinge upon a track of a disk and for condensing the reflected light beam so as to impinge upon a photodetector. The output of the photodetector is sampled at predetermined intervals so that the envelope value thereof may be read. Successive envelope values, as sampled, are compared to provide a difference signal thereof. An error signal is obtained based on the positive or negative difference signal. The position of the light spot is adjusted as a function of the error signal.

13 Claims, 18 Drawing Figures

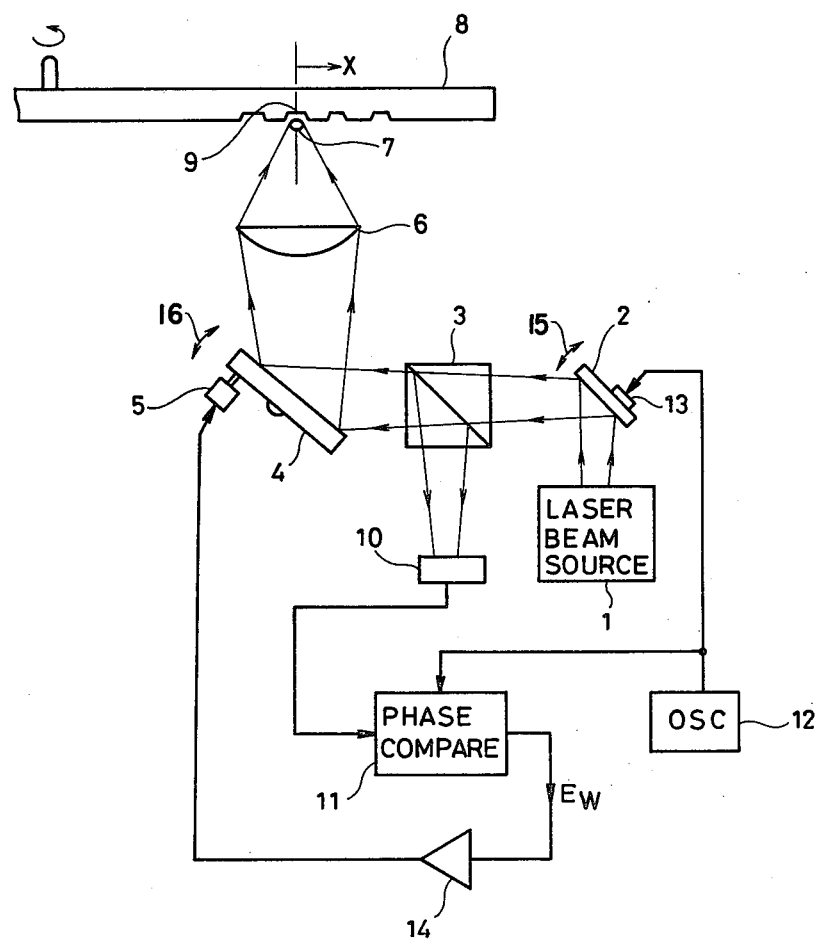
FIG.1 *Prior Art*

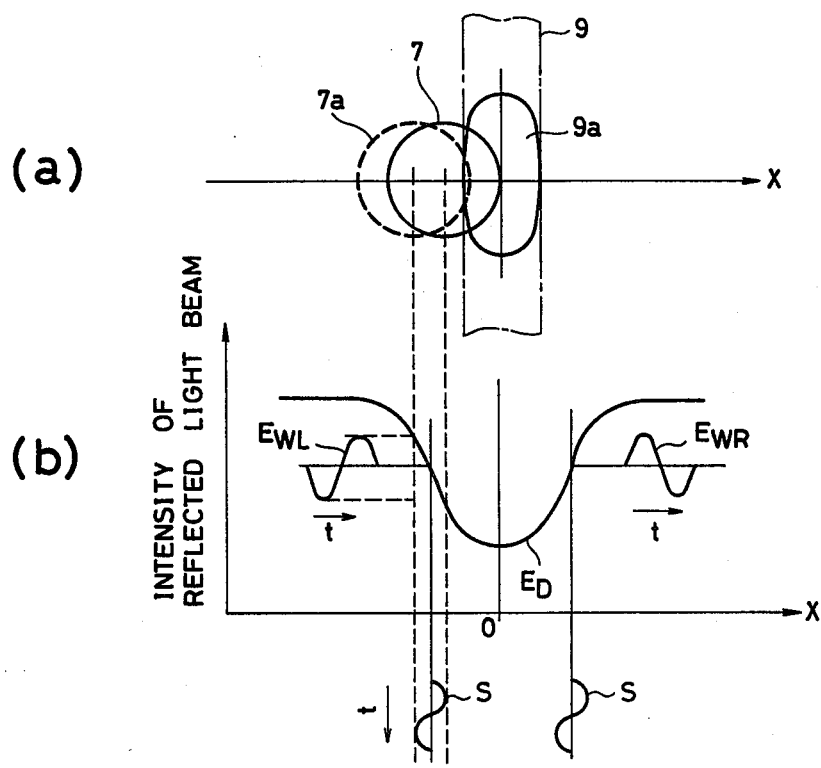
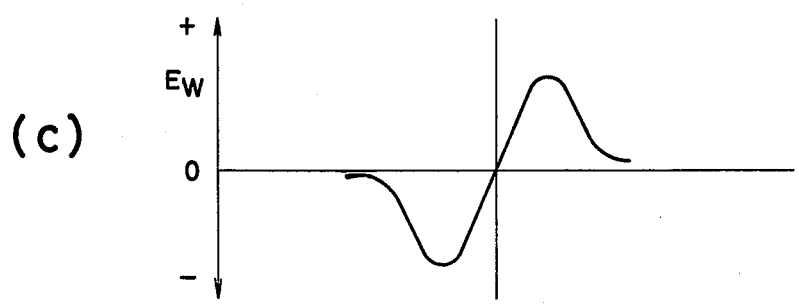

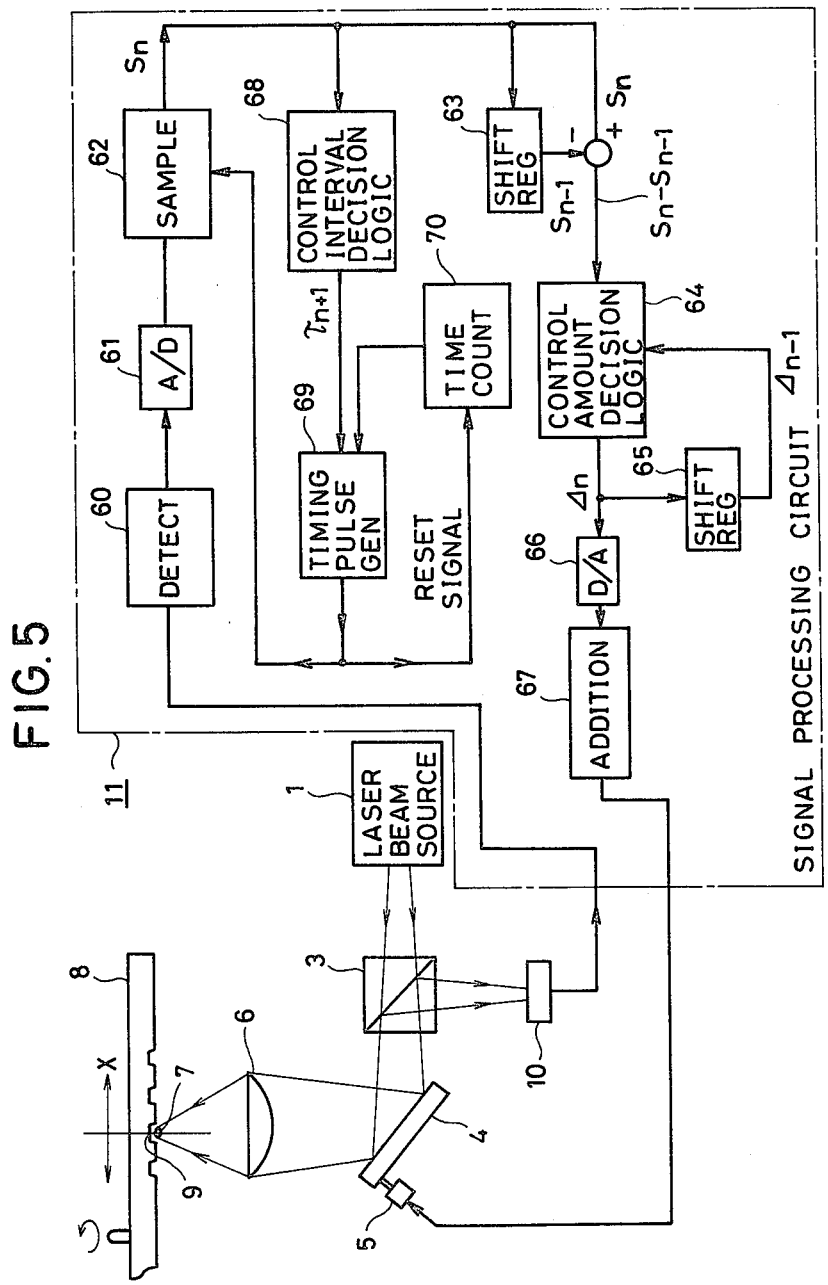

OPTICAL INFORMATION REPRODUCING APPARATUS

BACKGROUND OF THE INVENTION

1. Field of the Invention

The present invention relates to an optical information reproducing apparatus. More specifically, the present invention relates to an improvement in an optical servo system applicable to a radial tracking apparatus, a focusing apparatus or the like in a video disk player or the like.

2. Description of the Prior Art

A radial tracking apparatus, a focusing apparatus and the like have been proposed and put into practice for use with a video disk player or the like. An example of a radial tracking apparatus for use with a video disk player will be described in the following.

A conventional radial tracking apparatus is basically structured such that a reading laser beam is divided into three beams by means of a diffraction grating, three light spots are prepared by using one objective, the central spot being projected to the center of a track being traced on a disk for the purpose of reading and the two spots at both sides being projected such that the track is sandwiched from both sides, and the reflected light of these three light spots is condensed by the same objective, whereby the three reflected light beams are focused on three photodetectors, respectively, and an information signal is obtained from the central photodetector and an error output of radial tracking is obtained by evaluating the difference output of the photodetectors at both sides. If and when the track is positioned at the center of the read light spot, the light beams impinging on the photodetectors at both sides have the same intensity and accordingly the error output becomes zero. However, if and when the track position drifts left or right of the center of the read light spot, the intensities of the light beams incident on both photodetectors become unbalanced, whereby an error output is obtained. Therefore, the position of the light spot is adjusted so that the error output may be zero.

The above described conventional apparatus, however, involves shortcomings that require delicate optical components such as a diffraction grating and three photodetectors and further necessitates fine adjustment of a rotational angle of the diffraction grating and a three dimensional position of each of the three photodetectors.

An improvement for more or less eliminating such shortcomings has also been proposed, in an apparatus which is referred to as a wobbling type radial tracking apparatus. An example of the so-called wobbling type radial tracking apparatus is shown in FIG. 1. Referring to FIG. 1, the radial tracking apparatus shown comprises a laser beam source 1, a wobbling mirror 2 provided to be turnably vibrated in the direction of an arrow 15 by means of a piezoelectric element 13, a beam-splitter 3, a tracking mirror 4 provided to be turnably driven in the direction of an arrow 16 by means of an actuator 5, an objective 6 for forming a light spot 7, a disk 8 including tracks 9 of a series of pits recorded on the disk 8, a photodetector 10 for receiving a light beam reflected from the track 9, a phase detector 11, an oscillator 12 for providing an oscillator signal of the frequency f to a piezoelectric element 13, and a servo amplifier 14.

In operation, when a voltage of the frequency f obtained from the oscillator 12 is applied to the piezoelectric element 13 so that the wobbling mirror 2 is vibrated, the light beam from the light source 1 undergoes minor deflection at the frequency f. Therefore, the light spot 7 formed by the objective 6 is subjected to a minor amount of vibration at the frequency f in the direction transversing the track 9, which is referred to as wobbling. The light beam reflected from the track 9 at that time is separated from the incident light beam by means of the beam-splitter 3 and is detected by the light detector 10. As a result, an output characteristic as shown as (b) in FIG. 2 is obtained. The direct current intensity $E_D$ of the reflected light beam when the light spot 7 crosses the pit 9a of the track in the direction of arrow X as seen at (a) in FIG. 2 is as shown at (b) in FIG. 2. Accordingly, the alternating current intensities $E_{WL}$ and $E_{WR}$ obtained when the light spot 7 is subjected to minor vibration S are as shown at (b) in FIG. 2. It is seen that the waveform is reversed by 180° depending on whether the light spot 7 has deviated leftward or rightward from the center of the track. Therefore, referring to FIG. 1, when the output of the photodetector 10 is applied to the phase detector 11 for the purpose of phase detection using the output from the oscillator 12 as a reference signal, a track error signal $E_W$ as shown at (c) in FIG. 2 is obtained at the output of the phase detector 11. The track error signal is amplified by the servo amplifier 14 and the amplified output is applied to the actuator 5 for driving the tracking mirror 4 by properly selecting the polarity, so that the X directional position of the light spot 7 is controlled so as to be always positioned on the track 9.

The above described conventional apparatus has been simplified as compared with the fundamental type; however, such a wobbling tracking apparatus suffers from a number of shortcomings as set forth in the following. More specifically, it is required to wobble the light beam at the high speed, say normally 20 to 50 kHz, and it is extremely difficult to do so. Although a combination of a piezoelectric element and a mirror, as exemplified, is an effective approach, as a matter of practice numerous problems are involved that an adhering process is required for combining the mirror with the element, the vibration phase varies due to the temperature, optical adjustment is difficult and the like. In addition, it is unavoidable that the wobbling causes interference in a reproduced signal and hence a further disadvantage is involved that a beat interference is caused in the case of a video signal.

SUMMARY OF THE INVENTION

The present invention was developed for the purpose of eliminating the above described shortcomings and disadvantages involved in the conventional approach. Briefly described, the present invention aims to provide a servo system adapted such that an error signal is obtained by processing a reproduced radio frequency signal, whereby radial tracking or focusing is performed without the necessity of any additional optical components.

To that end, the present invention comprises an optical information reproducing apparatus, which comprises an optical system adapted to function such that a light spot is directed to the surface of a recording medium having a track on the surface thereof in which information is recorded in a manner readable by optical means so that the light spot is caused to impinge upon the track and the reflected light beam is condensed and is led to a photodetector. The inventive structure particularly includes a signal processing circuit including means for sampling the output signal from the photodetector at predetermined intervals for reading an envelope value thereof. The signal processing circuit includes means for comparing successive envelope values for providing a difference signal thereof, and means responsive to the sign of the difference signal for providing a correcting signal for reversing the direction of shifting the position of the light spot, whereby an error signal is obtained from the change of the envelope of the detected signal of the reflected light so that the position of the light spot may be controlled. Therefore, the present invention brings about significant advantage in that the structure of the optical system is considerably simplified as compared with the conventional servo system and accordingly permits a light pickup to be miniaturized.

In a preferred embodiment of the present invention, there is provided an optical information reproducing apparatus, which comprises an optical system adapted to direct a light spot to the surface of a recording medium having a track on the surface thereof in which information is recorded in a manner readable by optical means so that the light spot is caused to impinge upon the track and the reflected light beam is condensed and is led to a photodetector. Additionally, there is provided a signal processing circuit including means for sampling the output signal from the photodetector at predetermined intervals for reading an envelope value thereof, means for comparing successively read envelope values for providing a difference signal thereof, means responsive to the positive or negative sign of the difference signal for providing a correcting signal for reversing the direction of shifting the position of the light spot, means for delaying the correcting signal, and means for adding the delayed correcting signal and the original correcting signal, whereby an error signal is obtained from the change of the envelope of the detected signal of the reflected light and the error signal is further modified to a control signal adapted to the operational characteristic of the light spot reflecting means, whereupon the position of the light spot is controlled. As a result, the present invention provides significant advantages in that mainly the structure of the optical system is considerably simplified as compared with the conventional servo system and hence the light pickup can be considerably miniaturized, and in particular in that the operation of the light spot reflecting means is promptly stabilized and the follow up performance of the servo system is enhanced through skillful use of the feature of digital control.

Since the inventive radial tracking apparatus is only adapted to process the radio frequency output signal of the photodetector with an electric circuit, thereby to provide an error signal, any optical components such as a diffraction grating, a photodetector array, a wobbling mirror and the like which were required conventionally, can be eliminated. Therefore, the structure of the optical system is simplified and its cost is reduced and at the same time a very small sized light pickup can be obtained. More specifically, a pickup having a semiconductor laser, a beam-splitter, a tracking mirror, lenses and one photodetector can be provided in a single mirror.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a fundamental structure of a conventional radial tracking apparatus;

FIG. 2, consisting of (a)-(c), is a graph for explaining the operation of the FIG. 1 apparatus;

FIG. 5 is a block diagram of one embodiment of the present invention;

DESCRIPTION OF THE PREFERRED EMBODIMENTS

Figure 3:
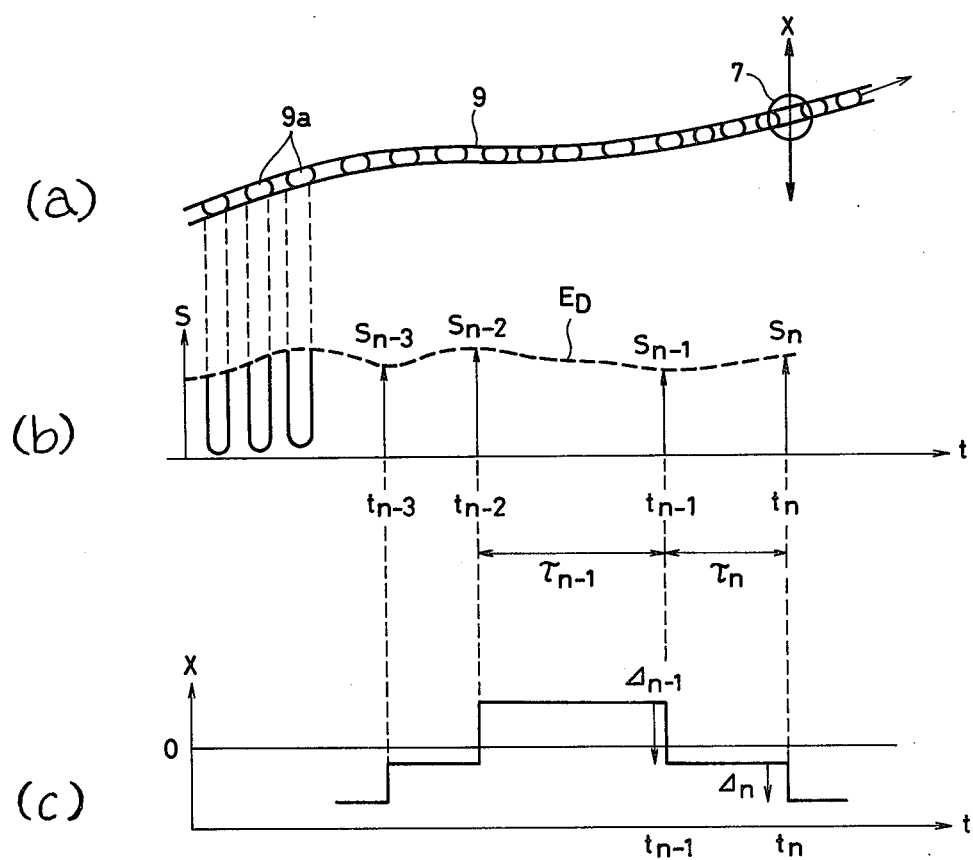
FIGS. 3 (a)-(c) and 4 are graphs for explaining the principle of the present invention.

First the principle of the present invention will be described in the following. Referring to FIG. 3, the manner in which the light spot passes on the track including a series of pits is shown at (a), the time sequential change of the intensity S of the light reflected from the track is shown at (b) and the change of the X directional control amount of the light spot is shown at (c). In the figure the zero line denotes the central line of the track 9. Now assuming that the light spot 7 passes along the pit series at shown as (a) in FIG. 3, the direct current intensity $E_D$ of the reflected light becomes an alternating current signal as modulated by the pits as shown at the left end of the waveform (b) shown in FIG. 2. However, since the repetition frequency of the pits is of the MHz frequency range, the signal is represented as an envelope change as shown in the frequency region (lower than several tens kHz) of the servo employed in the present invention and the pit series is also represented as a continuous track.

Now referring to the waveform (b) in FIG. 3, it is assumed that control has been made in the X direction, i.e. the direction crossing the track, or the radial direction as at the timings $t_{n-3}$, $t_{n-2}$, $t_{n-1}$ and the control amount at the timing $t_n$ is considered. It is assumed that the control amount in the X direction is allotted as a minor displacement $\Delta_i$ only at the respective control timing $t_i$. For simplicity, $\Delta_i$ is assumed to be $+\Delta$ or $-\Delta$ only and may be expressed as $$\Delta_i = \begin{cases} +\Delta \\ -\Delta. \end{cases}$$

Although it is possible to allot 0 or a finer graduation of $\Delta$ by way of $\Delta_i$, for simplicity of description it is assumed that $\Delta_i$ is $+\Delta$ or $-\Delta$ only.

Assuming that the control amount $\Delta_{n-1}$ is given at the timing $t_{n-1}$, the gist of the present invention resides in determination of the control amount $\Delta_n$ at the timing $t_n$ in accordance with the following equation:

$$\Delta_n = \text{Sign}(S_n - S_{n-1}) \cdot \Delta_{n-1} \qquad (1)$$

where Sign ( ) assumes the plus sign or the minus sign, if and when the content in ( ) is plus or minus, respectively. More specifically, the control amount at the timing $t_n$ provides the control amount of the same sign as that of the previous one ($+\Delta$ or $-\Delta$) if the difference which is obtained by subtracting the envelope value $S_{n-1}$ at the previous control timing $t_{n-1}$ from the envelope value $S_n$ at the timing $t_n$ (in actuality the envelope value immediately before the timing $t_n$) is positive in sign, and provides the control amount of the reversed sign ($+\Delta$ or $-\Delta$) if the above described difference is negative. In other words, if and when the envelope value increases by the previous control, the light spot is again moved in the same direction as that of the previous control, whereas if the envelope value decreases, the light spot is moved in the opposite direction to that of the previous control.

Figure 4:
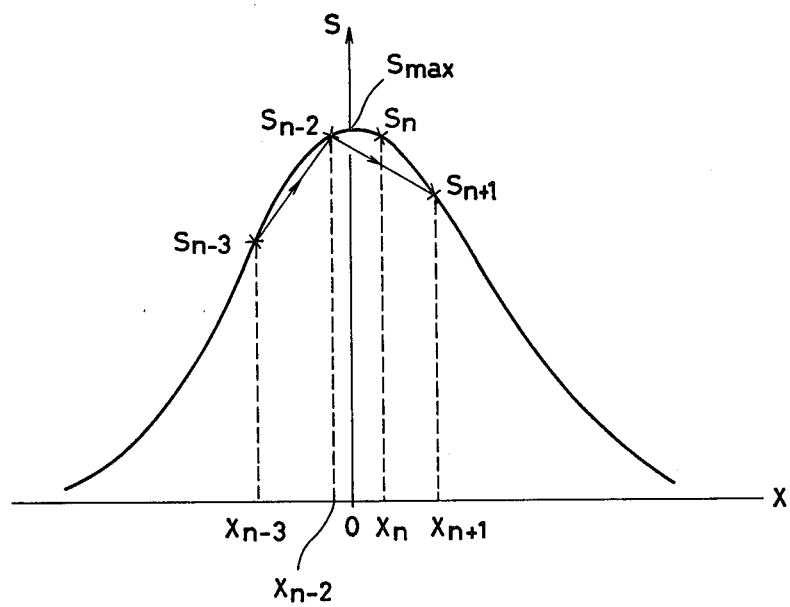

The result shown in FIG. 4 can be expected by the above described control of the light spot. Referring to FIG. 4, the envelope value exhibits a characteristic in which if and when the light spot comes to coincide with the track center 0 the envelope value S becomes the maximum value $S_{max}$ and deviation of the light spot in either leftward or rightward directions therefrom results in a gradual decrease. Since $S_{n-2} > S_{n-3}$ at that time, and $S_{n+1} > S_{n-2}$ was attained as a result of control in the same direction as $X_{n+1}$, at the next step the light spot is moved in the opposite direction such as toward $X_n$. As a result, the light spot is controlled to always approach the center of the track. By selecting $\Delta$ to be sufficiently small, say approximately 0.1 micron as compared with the track width of say 1 micron, the light spot 7 can be maintained at the center of the track 9.

Now a method of determining time intervals for control will be described in the following. Although it is simplest to periodically perform the control at predetermined time intervals, for the purpose of improving the response performance it is better to select a short period at the portion where the change of the envelope is large such as the curvature of the track is large and to select a long period in the portion where the change of the envelope is small such as the curvature of the track is small. Now let it be assumed that the minimum value of the control period $\tau$ is $\tau_0$ and $m_i$ is an integer number. The time interval $\tau_{n+1}$ ($=t_{n+1}-t_n$) between the control timing $t_{n+1}$ and the control timing $t_n$ is determined by the following equation:

$$\tau_{n+1} = m_{n+1} \cdot \tau_0 \qquad (2)$$

Now it is selected such that the integer number $m_{n+1}$ may be dependent on the magnitude of $S_n$. For example, assuming that the maximum value $S_{max}$ of the envelope signal S is represented as $S_{max} = 16$, then following changes are made;

$$S_n < 14 \rightarrow m_{n+1} = 1 \; (\tau_{n+1} = \tau_0)$$

$$14 \leq S_n < 15 \rightarrow m_{n+1} = 2 \; (\tau_{n+1} = 2\tau_0)$$

$$15 \leq S_n \rightarrow m_{n+1} = 4 \; (\tau_{n+1} = 4\tau_0)$$

Of course, the control time $\tau_{n+1}$ may be determined by making $m_{n+1}$ dependent on the difference $S_n - S_{n-1}$ of the envelope signal.

Now that the operation principle of the present invention was described in the foregoing, one embodiment of the inventive optical information reproducing apparatus will be described with reference to FIG. 5.

Referring to FIG. 5, the inventive optical information reproducing apparatus comprises a signal processing circuit 11, which comprises an envelope detector 60, an analog/digital converter 61, a signal sampling circuit 62, a shift register 63, a control amount decision logic circuit 64, a shift register 65, a digital/analog converter 66, an addition circuit 67, a control interval decision logic circuit 68, a timing pulse generating circuit 69, and a time counter 70.

Now the operation of the FIG. 5 embodiment will be described. The light beam obtained from the laser beam light source 1 is adapted to pass through the beam-splitter 3 and is reflected from the tracking mirror 4, whereupon the same is focused as the light spot 7 on the track 9 of the disk by means of the objective 6. The disk 8 is rotatably driven by a motor, not shown, and the objective 6 is always controlled so that the focus comes always on the disk 8 by means of a servo system including a well known focusing sensor and an actuator, not shown. Now referring to FIG. 3, it is assumed that the control up to the timing $t_{n-1}$ has been finished and an operation in the case where the control amount until the timing $t_n$ is to be determined will be described. Accordingly, it is assumed that the value of the timing $t_{n-1}$ has been afforded as an initial value of the system. The output from the photodetector 10 is detected by the envelope detector 60 and thus the envelope detected output is obtained. Then the envelope detected output is converted by the analog/digital converter 61 into a digital signal and the digital signal thus obtained is applied to the sampling circuit 62 having a memory function. Assuming a case where the timing pulse for making control at the timing $t_n$ is obtained from the timing pulse generating circuit 69, the envelope value $S_n$ at the timing $t_n$ appears at the output of the sampling circuit 62. On the other hand, the timing pulse is simultaneously fed to the time counter 70 as a reset signal, whereby the time counter is reset. The time counter again starts a time count operation from that time point and the count value is applied to the timing pulse generating circuit 69. Accumulation of the time count is started by the timing pulse generating circuit 69. Since the initial value $S_{n-1}$ has appeared at the output of the shift register 63, the value $S_n - S_{n-1}$ is created based on the above described value $S_{n-1}$ and the sampled $S_n$. The control amount decision logic circuit 64 is responsive to the applied $S_n - S_{n-1}$ signal and the initial value $\Delta_{n-1}$ appearing at the output of the shift register 65 to perform a logical operation in accordance with the equation (1), i.e. to determine whether the difference signal $S_n - S_{n-1}$ is positive or negative, thereby to determine the control amount $\Delta_n$ to be evaluated by multiplying the sign of the difference by $\Delta_{n-1}$. $\Delta_n$ is applied to the digital/analog converter 66 and is converted to an analog control voltage value, which is applied to the addition circuit 67. Since a signal for turning control of the tracking mirror 4 is obtained at the output of the addition circuit 67, the same is applied to the actuator 5, so that the tracking mirror 4 is controlled, whereby the X directional position of the light spot 7 is corrected to always position the light spot 7 on the track 9.

On the other hand, the envelope value $S_n$ is also fed to the control interval decision logic circuit 68, thereby to perform the logical operation of the equation (2), to determine the time interval $\tau_{n+1}$ until the next control timing $t_{n+1}$. The $\tau_{n+1}$ signal is applied to the timing pulse generating circuit 69, where the $\tau_{n+1}$ signal is compared with the time count value so far accumulated. When coincidence is established, the timing pulse is obtained and is applied to the sampling circuit 62, whereby the envelope value $S_{n+1}$ is read out and the next control cycle is started.

Meanwhile, although in the above described embodiment the control amount was assumed to be a constant value $\Delta$, alternatively the same may be of a value proportional to the difference $S_n - S_{n-1}$ of the envelope. More specifically, it may be adapted such that the larger the envelope difference the larger the control amount and the smaller the envelope difference the smaller the control amount, whereby a control of higher efficiency can be expected. In such a case, a signal of $\Delta_n \times |S_n - S_{n-1}|$ may be applied in place of the control amount $\Delta_n$ being applied to the digital/analog converter 66.

Figure 6:
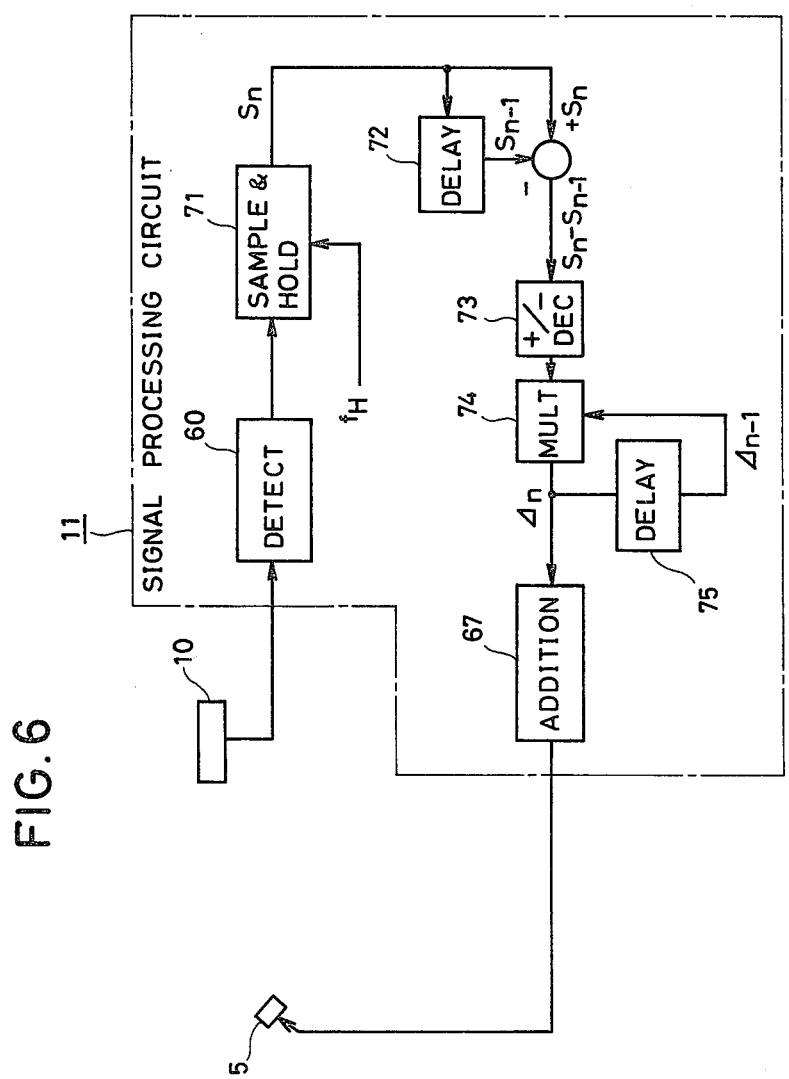
FIG. 6 is a block diagram of another embodiment of the present invention.

In the foregoing an example of digitally processing the signals for obtaining an error signal from the envelope signal was described; however, the same may be achieved by analog processing as shown in FIG. 6. Referring to the FIG. 6, a radio frequency signal from the photodetector 10 is detected by the detector 60, thereby to provide an envelope signal. When the timing pulse $f_H$ is applied to the sample and hold circuit 71, the envelope value $S_n$ is maintained. Since the $S_{n-1}$ signal has appeared at the output of the delay circuit 72, the difference $S_n - S_{n-1}$ of both signals is obtained and is applied to the plus/minus decision circuit 73 to provide a positive or negative constant voltage, which is then applied to the multiplier 74. Since the control amount $\Delta_{n-1}$ of the previous or preceding cycle has appeared at the output of the delay circuit 75 which is connected for delaying the output of the multiplier, the said value is applied to the multiplier 74, thereby to perform a multiplication of sign $(S_n - S_{n-1}) \times \Delta_{n-1}$ to obtain the control value $\Delta_n$. The control value $\Delta_n$ is then subjected to addition by the addition circuit 67 and the output is applied to the actuator 5, whereby the radial tracking control can be performed.

Incidentally described, the control amount in proportion to $S_n - S_{n-1}$ can also be obtained by applying the difference $S_n - S_{n-1}$ of the envelope signal directly to the multiplier 74 without applying the same to the plus/minus decision circuit 73 and by providing the plus/minus decision circuit between the output of the delay circuit 75 and the multiplier 74.

Meanwhile, although the foregoing embodiment was described by taking an example in which the signal $f_H$ of a predetermined period was employed as a timing pulse, it is a matter of course that a pulse of a variable period as employed in the FIG. 5 embodiment may be employed. As a pulse source of a predetermined period the horizontal synchronizing signal of the television ($f_H = 15.75$ kHz) may be preferably utilized and by selecting the frequency of the timing pulse to be an odd number times a half of $f_H$ an advantage is brought about that a possible appearance of a beat interference on a reproduced image under the influence of a residual error on the occasion of control of a predetermined period can be made visually imperceptible.

If and when the actuator is a pulse motor, for example, in the embodiments shown in FIGS. 5 and 6, the addition circuit 67 may be omitted. Information such as a video or audio signal can be obtained by applying the output of the photodetector 10 to a demodulating circuit, not shown.

Figure 7:
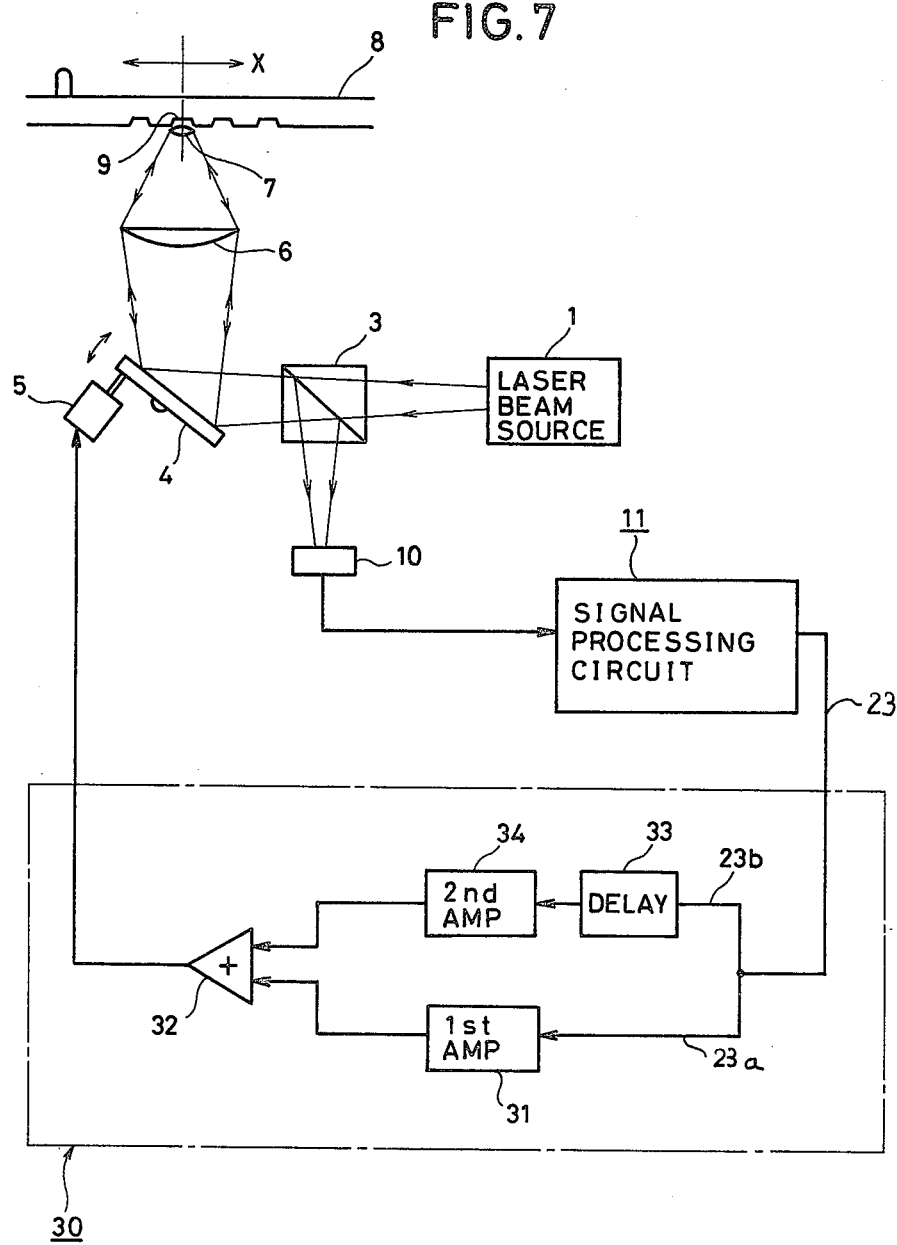
FIG. 7 is a block diagram showing a further embodiment of the present invention.

FIG. 7 is a block diagram showing a further embodiment of the present invention. The FIG. 7 embodiment is structurally similar to the optical information reproducing apparatus shown in FIG. 5 in that the laser beam reflected from the disk 8 is detected by the photodetector 10 and a signal for controlling the position of the light spot is generated through the signal processing circuit 11. More specifically, the light beam from the laser source 1 passes through the beam-splitter 3 and the tracking mirror 4 and is made to impinge upon the track 9 on the disk 8 by means of the objective 6 as a light spot 7. The laser beam modulated by the pits constituting the track is transmitted backward along the light path and is made to impinge upon the photodetector 10, thereby to provide a radio frequency signal. The radio frequency signal is then processed by the signal processing circuit 11 previously described in detail with reference to FIG. 5 and a basic correcting signal 23 is formed. The basic correcting signal 23, obtained as the output from the signal processing circuit 11, is divided at the servo circuit 30 to a first correcting signal 23a and a second correcting signal 23b. The first correcting signal 23a is applied to a first amplifier 31 and is amplified to a desired level, whereupon the same is applied to one input terminal of an adder 32, whereby the same timing as the correcting basic signal 23 of the base is maintained. On the other hand the second correcting signal 23b, as divided, is applied to a delay circuit 33 for delaying the input signal by a minor time period $\tau$ to be described subsequently and the delayed signal, as compared with the first correcting signal 23a, is then applied to a second amplifier 34 and is amplified to a desired level, whereupon the same is applied to the other input of the above described adder 32. The adder 32 performs an addition of both input signals, thereby to provide the output of the servo circuit, which sum output is applied to the actuator 5 for operating the tracking mirror 4, thereby to turn the mirror for reflecting the light spot to a desired position.

Figure 8:
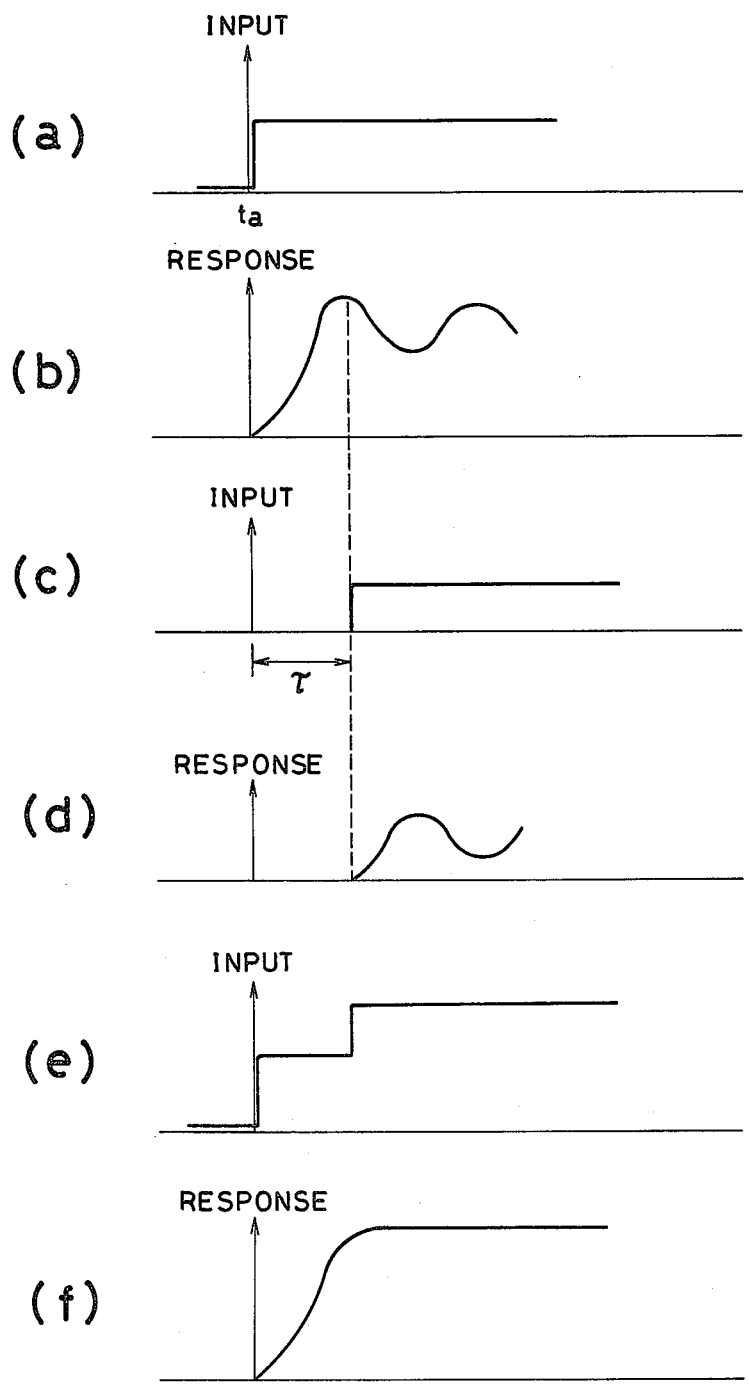
FIG. 8, consisting of (a)-(f), is a graph for explaining the operation of the embodiment of FIG. 7.

Now referring to FIG. 7, the delay time $\tau$ as set in the above described delay circuit 33 will be described. Referring to FIG. 8, the time sequential change of the input signal in the case where the first correcting signal 23a is applied through the first amplifier 31 direct to the actuator 5 is shown as (a), and the response waveform of the actuator 5 at that time is shown as (b). More specifically, as seen in (b), the actuator undergoes an oscillatory change at the beginning of the response and requires some time until the oscillation converges to a predetermined level. During a time period in which the response is oscillating the position of the light spot is not fixed and as the result the envelope value cannot be sampled for the purpose of correcting the light spot position. More specifically, prompt positional correction of the light spot cannot be made. Referring again to FIG. 8, the second correcting signal 23b obtained from the second amplifier 34 as delayed by minor time period $\tau$ is shown as (c), in which the delay time $\tau$ is selected to come in the vicinity of the time point when the response waveform (b) by the above described first correcting signal 23 reaches the peak, as shown in the figure. The response waveform of the actuator by the second correction signal 23b is also shown as (d) in FIG. 8 and also undergoes oscillation, which oscillation can be selected to exhibit the characteristic in which that the peak and trough appearing in the response waveform of the first correcting signal 23a are averaged by selecting the delay time $\tau$ and the gains of the first and second amplifiers 31 and 34. Accordingly, the correcting signal as composed as shown as (e) in FIG. 8 is formed by adding both input signals as shown as (a) and (c) in FIG. 8 through the adder 32 and the added correcting signal is applied to the actuator 5. The actuator 5 is responsive to such an input signal to exhibit a response characteristic approaching convergence in a short period of time undergoing little oscillation as shown as (f) in FIG. 8, whereby stabilization of the position of the light spot is expedited and sampling of the envelope value can be performed at an earlier time point as compared with the conventional apparatus.

Meanwhile, the delay time $\tau$ and the gains of the first and second amplifiers 31 and 33 can be selected to be the most appropriate values in consideration of the characteristic of the actuator 5 for use with radial tracking.

In the embodiment shown, information such as the video and audio signals from the disk 8 can be obtained by applying the output from the photodetector 10 to a demodulating circuit, not shown.

As will be appreciated from the foregoing description, the radial tracking apparatus of these embodiments are adapted to obtain an error signal by only processing the radio frequency output signal by an electric circuit and therefore any optical components such as a diffraction grating, a photodetector array, wobbling mirror and the like as conventionally required can be dispensed with, which simplifies the structure of the optical system and makes the cost thereof and at the same time makes it possible to implement an extremely small sized light pickup. More specifically, it is possible to implement a pickup housing within one mirror cylinder a semiconductor laser, beam-splitter, tracking mirror, lenses and one photodetector.

Figure 9:
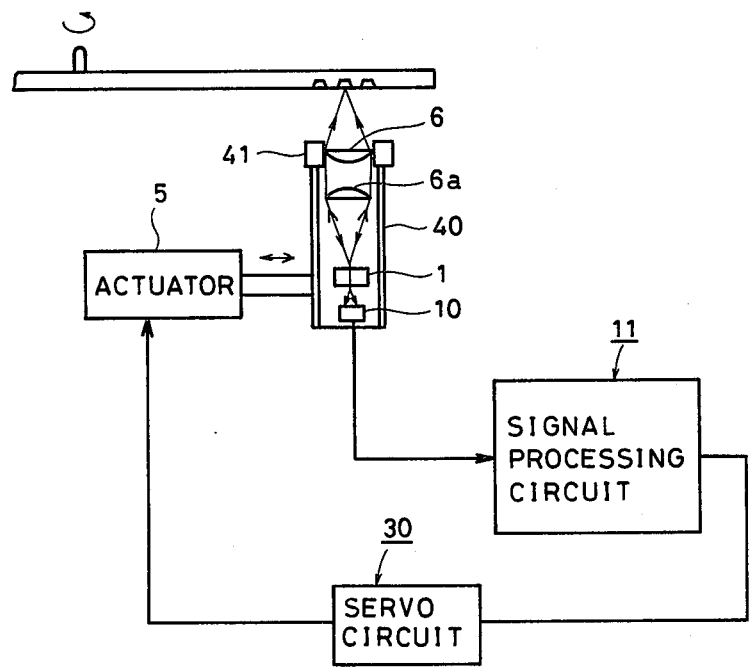
FIG. 9 is a diagrammatic view showing the structure of a light pickup employing the present invention.

FIG. 9 is a diagrammatic view showing one embodiment of the pickup. The semiconductor laser 1, collimating lens 6a, and an objective 6 are housed in single very small sized coaxial mirror cylinder 40 and the output of the photodetector 10 disposed to detect the rear side light beam (carrying information of the disk based on the principle of optical self-coupling) of the semiconductor laser 1 is processed by the processing circuit 11, whereupon the error signal thus obtained is applied through the previously described servo circuit 30 to the actuator 5, whereby the servo control in the radial direction is performed. The focusing control may be achieved by detecting an error by any one of the well known systems and by controlling the focus actuator 41.

Thus, the inventive system is extremely effective in miniaturization of such optical pickup and hence has a significant practical effect.

Meanwhile, although in the foregoing an example of the present invention as embodied in the radial tracking was described, it is to be pointed out that the present invention can also be applied to a focus servo. More specifically, the output from the signal processing circuit 11 from FIG. 9 may be applied to the focus actuator for driving the objective in an optical axis direction for the purpose of performing focus control. However, in such a case it is necessary to provide other sensors in performing the radial tracking. Although in the foregoing the embodiments were described as applied to the video disk, it is needless to say that the present invention can be widely applied to track tracing, focusing of other optical information reproducing apparatuses such as PCM audio disks, optical memories and the like, and linear or planar optical tracing apparatuses in measurement or working.

Although the present invention has been described and illustrated in detail, it is clearly understood that the same is by way of illustration and example only and is not to be taken by way of limitation, the spirit and scope of the present invention being limited only by way of the terms of the appended claims.

What is claimed is:

1. An optical information reproducing apparatus, comprising:
    an optical system adapted for shifting a position of a light spot in a direction to impinge upon a surface of a recording medium having a track having information recorded thereon in a form readable by means of optical means and for condensing a reflection of said light spot for causing the same to impinge upon a photodetector,
    means for sampling at predetermined intervals an output signal of said photodetector for reading a value of an envelope signal thereof in the form of a succession of envelope values,
    means for comparing successively read envelope values for providing a difference signal representing a difference therebetween,
    means responsive to the sign of said difference signal for providing a correcting signal for reversing the direction of shift of the position of said light spot, and
    light spot position adjusting means responsive to said correcting signal for adjusting the position of said light spot.

2. An optical information reproducing apparatus, comprising:
    an optical system adapted for shifting a position of a light spot in a direction to impinge upon a surface of a recording medium having a track having information recorded thereon in a form readable by means of optical means and for condensing a reflection of said light spot for causing the same to impinge upon a photodetector,
    means for sampling at predetermined intervals an output signal of said photodetector for reading a value of an envelope signal thereof in the form of a succession of envelope values,
    means for comparing successive envelope values for providing a difference signal representing a difference therebetween,
    means responsive to the sign of said difference signal for providing a correcting signal for reversing the direction of shift of the position of said light spot,
    means for delaying said correcting signal for providing a delayed correcting signal,
    means for adding said correcting signal and said delayed correcting signal for providing a sum signal representing the sum thereof, and
    light spot position adjusting means responsive to said sum signal for adjusting the position of said light spot.

3. An optical information reproducing apparatus in accordance with claim 1 or 2, which further comprises means for changing the sampling intervals of the output of said photodetector to be in reverse proportion to the value of said difference signal.

4. An optical information reproducing apparatus in accordance with claim 1 or 2, which further comprises means for changing said predetermined intervals for sampling the output signal of said photodetector in proportion to the value of said envelope signal.

5. An optical information reproducing apparatus in accordance with claim 1 or 2, wherein said optical system comprises light spot shifting means comprising a radial tracking mirror, and an actuator responsive to said correcting signal for controlling said radial tracking mirror.

6. An optical information reproducing apparatus in accordance with claim 1 or 2, wherein said optical system comprises light spot shifting means comprising, an objective, and focus actuator for driving said objective.

7. An optical information reproducing apparatus in accordance with claim 1 or 2, wherein said recording medium comprises a video disk, and the predetermined intervals for reading said envelope signal values are determined by a frequency selected to be an odd number times a half of a frequency of a horizontal synchronizing signal of a video signal recorded on said disk.

8. In an optical information reproducing apparatus including an optical system having a light beam generator for generating a light beam for reading information from a track on a recording medium and a control system for positioning said light beam along said track, the improvement comprising:

first means within said control system for detecting a change in an envelope of the information read from said track and producing a control signal as a function of the detected change, and second means, responsive to said first means, for displacing said light beam in accordance with said detected change.

9. An optical information reproducing apparatus in accordance with claim 8 wherein said control system includes sampling means for obtaining samples of said envelope of said information, and wherein said first means produces said control signal as a function of successive samples of said envelope.

10. An optical information reproducing system in accordance with claim 9 wherein said first means further includes means for detecting a difference between envelope values of said successive samples, means for determining a sign of said difference, and means for producing said control signal as a function of said sign of said detected difference.

11. An optical information reproducing system in accordance with claim 8 wherein said optical system comprises transducer means including laser light beam generating means, collimating lens means for said light beam, movable objective lens means for focussing said light beam on said recording medium, and photodetecting means for detecting light reflected from said recording medium, said optical system further including mirror cylinder means enclosing said transducer means, and means responsive to said control system for displacing said mirror cylinder means.

12. An optical information reproducing system in accordance with claim 8 wherein said optical system comprises:

objective lens means for focusing said light beam on said recording medium;

means for fixedly directing said light beam from said light beam generator; and photodetecting means for detecting light reflected from said recording medium;

said second means comprising controllably positioned tracking mirror means for receiving said fixedly directed light beam and for directing said light beam onto said objective lens.

13. An optical information reproducing system in accordance with claim 8 wherein said light beam generator comprises a substantially fixed laser beam source.

* * * * *